Patented May 8, 1928.

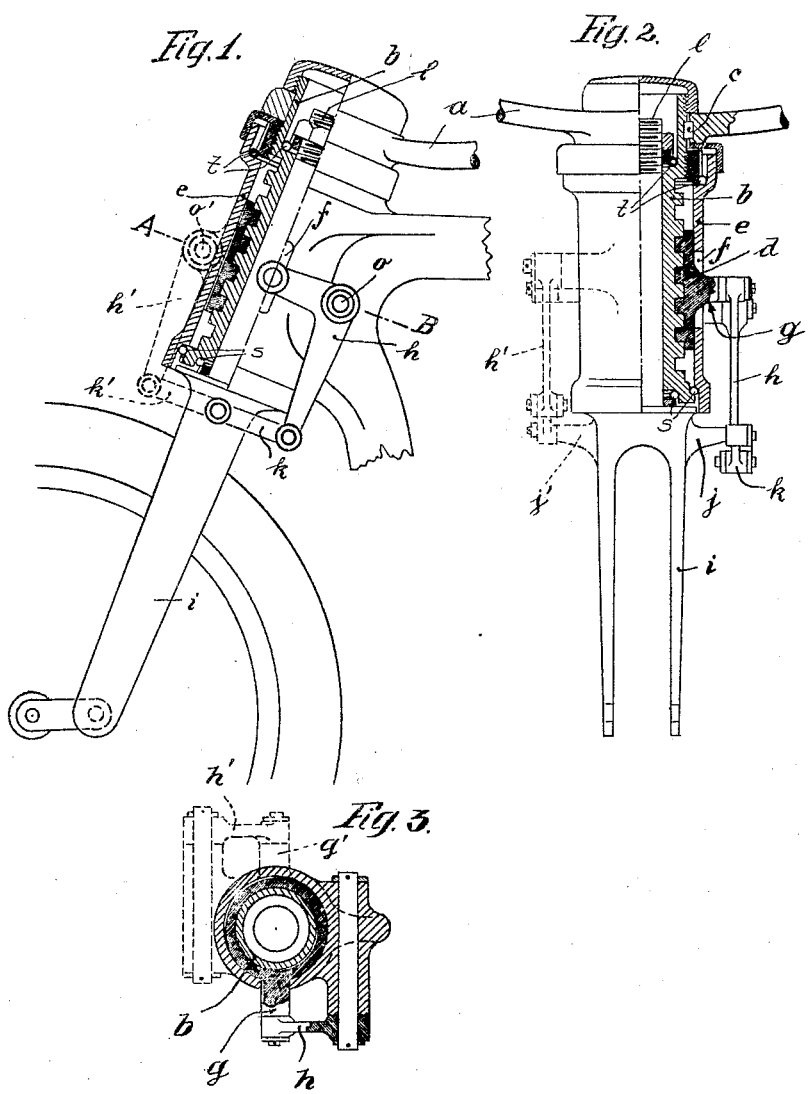

1,668,571

UNITED STATES PATENT OFFICE.

ALBERT NIEDERBERGER, OF VIENNA, AUSTRIA.

STEERING MEANS FOR CYCLES, MOTOR CYCLES, AND OTHER VEHICLES.

Application filed September 18, 1926, Serial No. 136,308, and in Austria October 7, 1925.

The present invention relates to improvements in steering means for cycles, motor cycles and other vehicles provided with single wheel steering means, such as for example tricycles (motor cycle with side car.)

The present invention essentially comprises a screw-threaded shaft (worm shaft, tube provided with curved groove or gate or the like) rigidly connected with the steering or handle bar and a movable nut, which is operated by the said shaft and the movements or adjustments of which are transmitted to the front forks by means of levers and connecting rods in such a manner, that the front wheel can be set or adjusted in any convenient direction.

Several modes of carrying out the present invention are illustrated by way of example on the accompanying sheet of drawings, in which—

Figs. 1 and 2 shows the steering means in part-sectional side view and front view respectively.

Fig. 3 is a sectional plan view of the arrangement according to the present invention.

The screw-threaded shaft $b$ is firmly connected with the handle bar $a$ by means of a key $c$, and by turning the handle bar to the right or left hand side, the said shaft is moved about its longitudinal axis. Thereby also the nut $d$ is moved up and down, which is mounted on the screw-threaded shaft $b$ and is secured against rotation by the slot $f$, arranged in the steering casing $e$. A pin $g$, secured to the nut $d$, is rotatably mounted in one arm of a double armed lever $h$, which is rotatably secured to a pivot $o$ of the steering casing $e$. On moving up or down the nut $d$, the double armed lever $h$ is moved forward or backward, whereby the steering connecting rod $k$ moves the front fork $i$ and thus the front wheel in the desired direction, one end of the said rod being pivotally secured to the double armed lever $h$ and the other end thereof is attached to a pin $j$, secured to the front fork $i$. The double armed lever $h$, the steering connecting rod $k$ and the two-pins $g$ and $j$ may be disposed at one side or at both sides of the steering casing $e$, as illustrated in dotted lines and designated by the letters $g'$, $h'$, $j'$, $o'$, and $k'$.

The screw-threaded shaft $b$ is mounted on ball-bearings $s$ in the steering casing $e$, while the fork-tube $l$ passes through the latter and is mounted on ball-bearings $t$.

Another advantage of the steering gear according to the present invention consists in that any lateral forces acting on the front wheel are completely eliminated and therefore are not felt during the steering, because the threads of the screw-shaft preferably are of a self-impeding character.

I claim—

1. Steering means for cycles, motor cycles and other vehicles comprising in combination a handle bar, a shaft firmly connected with the latter, a groove in the said shaft, a movable member which engages the groove and is adjusted by the movement of the handle bar, and transmitting members connected with the said movable member and the front fork of the vehicle for transmitting the motion of the movable member to the front fork in order to adjust the latter to any desired direction.

2. Steering means for cycles, motor cycles and other vehicles comprising in combination a handle bar, a shaft firmly connected with the latter, a screw-shaped groove in the said shaft, a movable member which engages the screw-shaped groove and is adjusted by the movement of the handle bar, transmitting levers pivotally attached to the said movable member connecting rods pivotally secured to the said levers, and a pin connecting the said rods with the front fork of the vehicle, for the purpose specified.

In testimony whereof I affix my signature.

ALBERT NIEDERBERGER.